US007111834B2

(12) United States Patent
Steele et al.

(10) Patent No.: US 7,111,834 B2
(45) Date of Patent: *Sep. 26, 2006

(54) SWING-ARM CLAMP

(75) Inventors: Kenneth A. Steele, Fort Wayne, IN (US); William E. Davenport, Fort Wayne, IN (US); Bruce D. McIntosh, Monroeville, IN (US)

(73) Assignee: PHD, Inc., Fort Wayne, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/203,726

(22) Filed: Aug. 15, 2005

(65) Prior Publication Data

US 2005/0275147 A1 Dec. 15, 2005

Related U.S. Application Data

(63) Continuation of application No. 10/601,728, filed on Jun. 23, 2003, now Pat. No. 6,929,254.

(60) Provisional application No. 60/391,055, filed on Jun. 24, 2002.

(51) Int. Cl.
*B23Q 3/08* (2006.01)
*F01B 21/00* (2006.01)
*F01B 3/00* (2006.01)

(52) U.S. Cl. ............................ 269/24; 269/32; 269/27; 92/2; 92/31; 92/32

(58) Field of Classification Search .................. 259/24, 259/32, 27, 91, 92; 92/165 PR, 136, 2, 31–33; 269/24, 32, 27, 91, 92
See application file for complete search history.

(56) References Cited

U.S. PATENT DOCUMENTS

| | | | | |
|---|---|---|---|---|
| 3,572,216 | A * | 3/1971 | Seesody | 92/33 |
| 3,948,502 | A * | 4/1976 | Waller et al. | 269/27 |
| 3,973,472 | A * | 8/1976 | Russell, Jr. | 92/13.6 |
| 4,265,434 | A * | 5/1981 | Hamilton et al. | 269/27 |
| 4,560,152 | A * | 12/1985 | Miller | 269/24 |
| 4,620,695 | A * | 11/1986 | Vanistendael | 269/24 |
| 4,682,535 | A * | 7/1987 | Stoll | 92/165 PR |
| 5,108,079 | A * | 4/1992 | Yonezawa et al. | 269/24 |
| 5,695,177 | A * | 12/1997 | Mascola | 269/24 |
| 5,778,511 | A * | 7/1998 | Keaton | 29/559 |
| 6,113,086 | A * | 9/2000 | Yonezawa | 269/24 |
| 2003/0110941 | A1* | 6/2003 | Shteynberg | 92/143 |
| 2003/0189279 | A1* | 10/2003 | Yonezawa et al. | 269/24 |

* cited by examiner

*Primary Examiner*—Joseph J. Hail, III
*Assistant Examiner*—Bryan R. Muller
(74) *Attorney, Agent, or Firm*—Barnes & Thornburg LLP

(57) ABSTRACT

A swing-arm clamp is provided. The swing-arm clamp has a piston rod which is disposed therein. The piston rod is movable through the swing-arm clamp in response to movement by the piston along a longitudinal axis between first and second positions. The clamp also has a plug that is selectively positionable to affect the positioning of the piston rod.

5 Claims, 7 Drawing Sheets

SWING-ARM CLAMP

RELATED APPLICATIONS

The present application is related to and claims priority to U.S. Provisional Patent Application, Ser. No. 60/391,055, filed on Jun. 24, 2002, entitled "Swing Arm Clamp" and is a continuation of U.S. utility patent application Ser. No. 10/601,728, filed on Jun. 23, 2003, now U.S. Pat. No. 6,929,254, entitled "Swing Arm Clamp" The subject matter disclosed in that provisional application is hereby expressly incorporated into the present application.

TECHNICAL FIELD

The present disclosure relates to swing-arm clamps and more particularly to swing-arm clamps having protective accessories attached thereto.

BACKGROUND

Swing-arm clamps are commonly known in the art. They are characterized by their clamping arm which not only extends and retracts, but also rotates or otherwise moves askew of the extending or retracting movement. Such clamps are typically used in assembly lines or other work environments where the swing-arm clamp engages and secures a workpiece to secure the same in place while some operation is conducted thereon. These clamps are useful in that they have the ability to not only clamp and release the workpiece, but the clamp can also move clear of the workpiece so it can be moved.

Examples of such clamps are found, for example, in U.S. Pat. Nos. 5,437,440 and 6,435,493 B1, the disclosures of which are herein incorporated by reference.

Because such clamps operate in assembly line or like environments, they are susceptible to damage. The dynamic nature of such conditions, where large, heavy workpieces and parts are being repeatedly moved, stamped or welded together, create virtually limitless opportunities for these clamps to become damaged. The repetition of clamping and releasing workpieces may cause a "backlash" on the clamp which can wear parts and eventually impair or otherwise damage the clamp. For example, typical swing-arm clamps have a bearing or other similar member attached to either the piston rod or the piston that engages a winding cam track. It is the bearing following the cam track that causes the arm attached to the piston rod to swing or move askew while the rod is extending and retracting. Typically, when the piston rod retracts and clamps down onto a workpiece, the resulting forces are referred to as "backlash." This "backlash" transfers force into the bearing and cam track. The constant repetition of the swing-arm clamp extending and releasing is what may cause the wear between the bearing and cam track. This is unless the "backlash" can be transferred to another structure that will relieve the bearing and the cam track. It would, thus, be beneficial to provide such structure, or structures.

Another potential hazard for such swing-arm clamps is weld splatter. The splatter is produced while workpieces are being joined and welded together during an assembly operation, for example. Because the clamp arm extends and retracts between release and clamp positions, the piston rod, which produces the extension and retraction, is often, at least partially, exposed. Weld splatter might deposit onto the exposed portion of the piston rod, cool, harden, and prevent the piston rod from properly extending and retracting. This, consequently, prevents the clamp arm from clamping or releasing the workpiece. It would therefore be beneficial to provide a shield to protect the piston rod from weld splatter or the like.

Accordingly, a swing-arm clamp may be provided which comprises an actuator, a piston, a body, a piston rod, an arm, a guide, and a locating member. The piston is movable within the body in response to the actuator. The piston rod is located within the body and extends from the piston. In addition, the piston rod is movable through the body in response to movement by the piston along a longitudinal axis between first and second positions. The piston rod is also movable about the longitudinal axis as it is movable along the longitudinal axis. The arm is attached to the piston rod, being movable both along the longitudinal axis between the first and second positions, and about the longitudinal axis. The locating member is movable in concert with the piston rod. The locating member also engages the guide when the arm is located in the first position and separates from the guide when in the second position.

In the above-described and other embodiments, the swing-arm clamp may comprise: a first position of the arm and piston rod being a clamping retracted position; a second position being the releasing extended position; a guide being attached to the body; the guide being adjustable with respect to the body; a plug attachable to the body and movable with respect thereto; the plug being selectively positionable to affect the positioning of the piston rod about the longitudinal axis at the first and second positions; the plug being selectively locked in a desired position; the plug being located in a bore in the body; the plug having a threaded periphery that is engagable with a threaded periphery on the bore; the plug having a set that secures the plug in a desired position; the plug having a spline disposed therein and the set being a fastener disposed in the plug and engagable with the spline such that engagement of the spline secures the plug in the desired position; the spline of the plug is disposed in the plug's threaded periphery; a locating member being attached to the arm; a shield that shrouds the piston rod when the same is in its first position; a locating pin being attached to the shield; and the locating pin being an angled member, one end of which extends into the guide when the piston rod is located in the first position.

Another illustrative embodiment provides a swing-arm clamp which comprises an actuator, a body, a rod, a clamp and a shield. The rod is disposed in the body and is movable longitudinally in response to the actuator. The rod is also rotatable with respect to its longitudinal movement. In addition, the rod is at least partially extendable from the body. The clamp arm is attached to the rod. The shield at least partially obscures at least a portion of the rod that is at least partially extended from the body.

In the above-described and other embodiments, the swing-arm clamp may comprise: a rod being movable between first and second positions; a shield obscuring a portion of a rod that is extended from a body when the rod is in the first position; the shield being located adjacent a clamp arm; and a locating member attached to the clamp that is engagable with a guide member which is also attached to the clamp.

Another illustrative embodiment provides a swing-arm clamp which comprises a body, a piston assembly, a cam member, and a base. The piston assembly is disposed in the body and is movable longitudinally with respect to the body. The cam member has a camming surface disposed therein which is in communication with the piston assembly to cause movement of same askew of its longitudinal movement. The base is attached to the cam member and is selectively movable to affect the askew movement of the piston assembly.

In the above-described and other embodiments, the swing-arm clamp may comprise: a base having a lock that will selectively maintain the base at a desired position; the lock being a fastener; a base being located in a bore disposed in a body; a base having a threaded periphery that is engagable with a corresponding threaded periphery of a bore. A base having a spline disposed therein, wherein a fastener is engagable with the spline such that engagement of the spline by the fastener secures a plug in a desired position; the spline of the base is disposed in the threaded periphery of the base.

Another illustrative embodiment provides a swing-arm clamp having a rod extending from a body. The rod is movable along a longitudinal axis and is movable through the body between clamping and releasing positions. The rod is also movable about the longitudinal axis. The swing-arm clamp also comprises a means for absorbing force caused from backlash created as the swing-arm clamp clamps a workpiece.

Another illustrative embodiment provides a swing-arm clamp having a rod extending from a body. The rod is movable through the body along a longitudinal axis between a clamping position and a releasing position. The rod is also movable about the longitudinal axis. A shroud is located adjacent the piston rod to obscure at least a portion of the same when the piston rod is in the clamping position.

Additional features and advantages of the swing-arm clamp will become apparent to those skilled in the art upon consideration of the following detailed description of the illustrated embodiment exemplifying the best mode of carrying out the swing-arm clamp as presently perceived.

BRIEF DESCRIPTION OF DRAWINGS

The present disclosure will be described hereafter with reference to the attached drawings which are given as non-limiting examples only, in which.

Corresponding reference characters indicate corresponding parts throughout the several views. The exemplification set out herein illustrates embodiments of the swing-arm clamp, and such exemplification is not to be construed as limiting the scope of the swing-arm clamp in any manner.

DETAILED DESCRIPTION OF THE DRAWINGS

Figure 1:
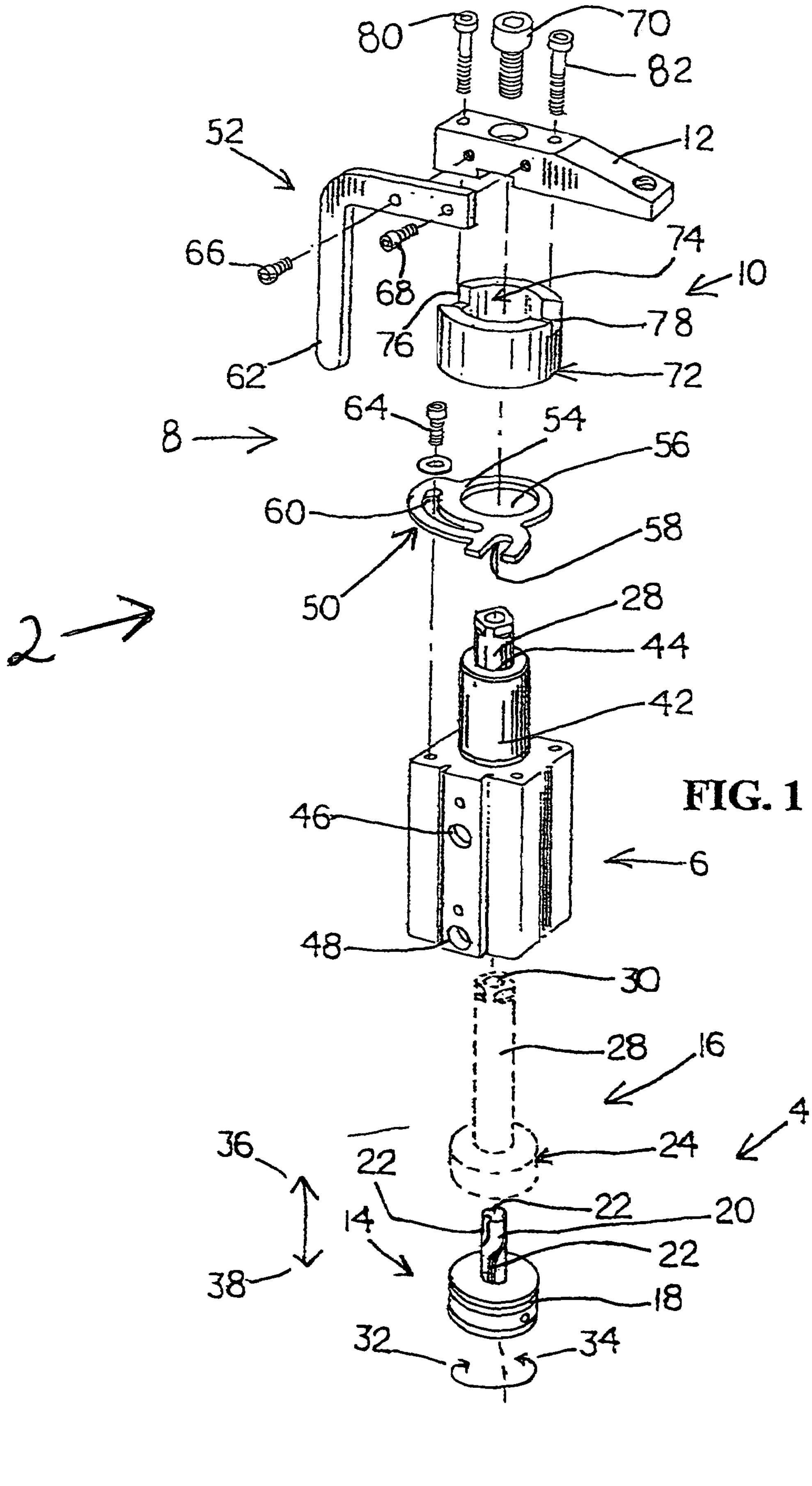
FIG. 1 is an exploded view of an illustrative swing-arm clamp including an illustrative guide assembly and collar assembly.

An exploded view of an illustrative swing-arm clamp 2 is shown in FIG. 1. Assembly 2 comprises a driver assembly 4, a body 6, a guide assembly 8, a collar assembly 10 and an arm 12. Illustratively, the driver assembly 4 comprises a base assembly 14 and a piston assembly 16. The base assembly 14 illustratively comprises a plug 18 and a longitudinally-extending cam member 20 having, illustratively, a plurality of cam paths 22 formed thereon. In the illustrative embodiment, the cam paths 22 are shown to be helically formed or otherwise askew on the cam member 20. It is appreciated that the number of cam paths 22 formed in cam member 20 can vary depending on the needs of the clamp, which is known by those skilled in the art. Piston assembly 16, shown in phantom, comprises a piston 24 which, itself, illustratively comprises a sealing body 26 for providing a seal as the piston moves within body 6. A piston rod 28 having a bore 30 disposed therethrough, extends from piston 24. It is appreciated that cam member 20 will be disposed within coaxial bores of piston rod 28 and piston 24 to affect the movement of piston rod 28. (See, also, FIG. 4.) A bearing member, not shown, is affixed to the inner bore of piston assembly 16 which will follow cam path 22 to cause rotation of piston rod 28 in directions 32 and 34 while piston rod 28 is also moving in directions 36 and 38 via pneumatic or similar actuation known to those skilled in the art.

Base assembly 14 and piston assembly 16 are fitted within a cavity 40 formed in body 6. (See FIG. 4.) Illustratively, a collar 42 extends from body 6 having a bore 44 disposed therethrough to receive piston rod 28 which extends therefrom, as shown in FIG. 1. Body 6 also illustratively comprises actuation ports 46 and 48 which provide power to the opposing sides of piston 24 to move the same in directions 36 and 38. It is appreciated, however, that the means for actuation is not limited to pneumatic power. For example, assembly 2 can be configured to be driven by hydraulic or electrical power.

Guide assembly 8 illustratively comprises a guide portion 50 and a locating member portion 52. In this illustrative embodiment, the guide portion comprises a guide member 54 having a bore 56 disposed therein to receive collar 42 as well as a locating guide 58 and an adjustment slot 60. Locating guide 58 is configured to receive a locating member 52 at a certain position of the stroke of piston rod 28. The adjustment slot 60 includes an adjustable fastener 64 so that guide member 54 can be moved to any variety of circumferential positions about collar 42.

Also in the illustrative embodiment, locating member 52 is attached to arm 12 via fasteners 66 and 68 as shown in FIG. 1. The arm 12, itself, is attached to piston rod 28 via fastener 70. Collar assembly 10 illustratively comprises a collar 72 having a bore 74 disposed therethrough to receive a portion of piston rod 28 and even collar 42 in some embodiments. The collar 72 further comprises locating recesses 76 and 78, as shown, so that arm 12 can be properly located therein. Fasteners are disposed through arm 12 and attached to collar 72 at locating recesses 76 and 78, respectively.

Figure 2:
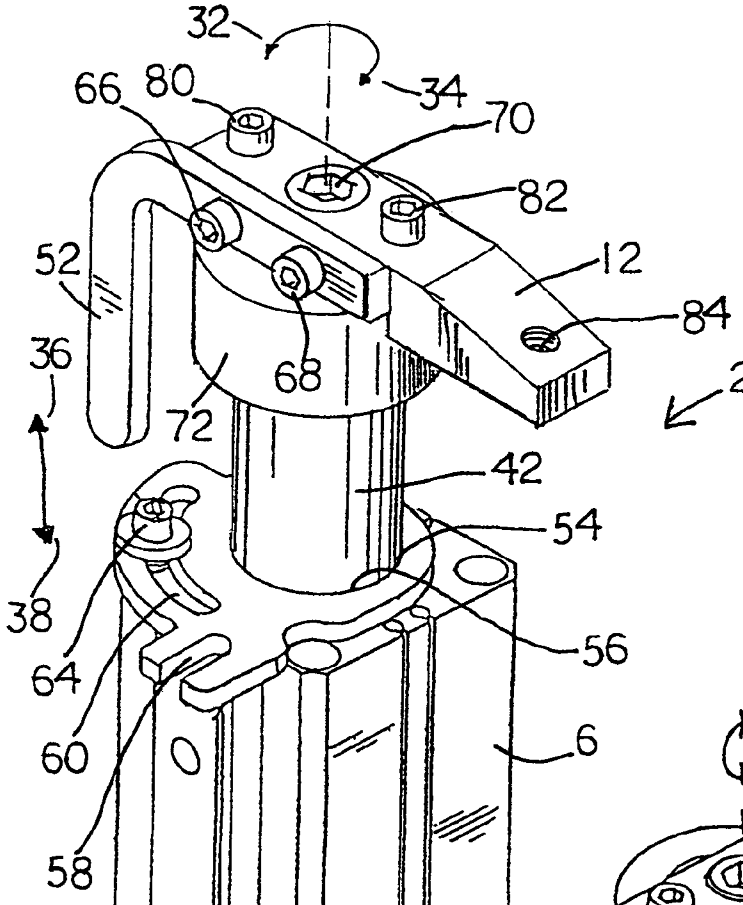
FIG. 2 is a perspective view of the illustrative swing-arm clamp of FIG. 1 in an extended position.
Figure 3:
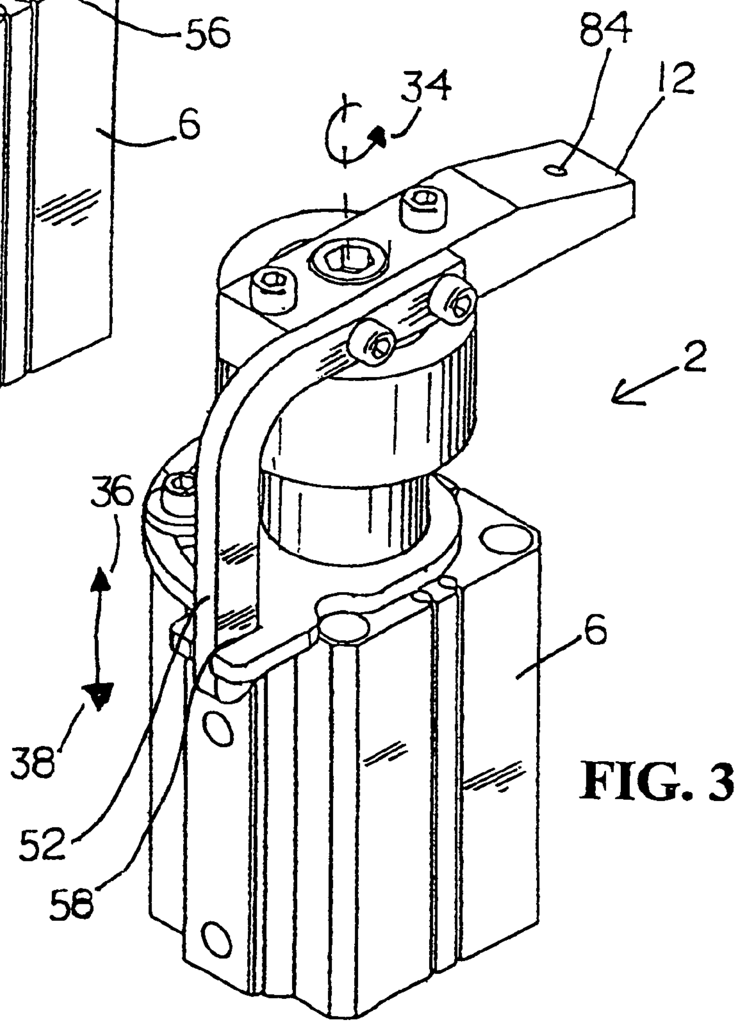
FIG. 3 is a perspective view of the illustrative swing-arm clamp of FIG. 2 in a retracted position.

FIGS. 2 and 3 are illustrative perspective views of assembly 2. Specifically shown in FIG. 2 is arm 12 located in an extended position. In FIG. 3, arm 12 is located in a retracted position. In this illustrative embodiment, the retracted position, as shown in FIG. 3, is considered the clamping position; whereas the extended position, as shown in FIG. 2, is considered the releasing position. A bore 84 is configured to receive a clamp or gripper tip (not shown) which is commonly known to those skilled in the art. The clamping position, as shown in FIG. 3, occurs when the piston rod moves arm 12 in direction 38 as well as in direction 34. Conversely, the releasing position, as shown in FIG. 2, occurs when the arm 12 is moved in direction 36 and in direction 32.

It is also shown in FIG. 3 that, in the clamping position, locating member 52 is located within guide 58. Because forces can act on arm 12 when the same clamps a workpiece (not shown) when in the clamping position, a backlash force could be produced which may cause damage to portions of the clamp, particularly the bearing member and cam path. In one illustrative embodiment, the locating member 52 is positioned in guide 58 so that the forces created by clamping down on a workpiece become transmitted through the locating member and guide rather than the bearing member and the cam path within body 6. Having guide assembly 8 absorb at least a portion of those forces may reduce the amount of wear and/or damage that may occur between the operating parts within body 6. Because the plug of assembly 2 is rotatable with respect to body 6, so too is the precise clamping and releasing positions of jaw arm 12. This allows arm 12 to position itself out of the way when in the releasing position, yet, engage and hold the workpiece when in the clamping position. This rotation, again, is caused from the illustrative helical shape of cam paths 22 as known by those skilled in the art.

Because of the helical nature of cam path 22, the rotational position of arm 12, at either the extended releasing position or the retracted clamping position, can be changed. As shown in FIG. 2, for example, the fastener 64 engages slot 60 or guide member 54, allowing adjustability of the same with respect to body 6. The guide member 54 is pivotable so that locating member 52 will engage guide 58 at the appropriate rotated position when the clamp is retracted. It is appreciated that the amount of rotation, clamping or releasing positions disclosed herein are illustrative and can be modified by those skilled in the art. For example, it is contemplated that the clamping position might be the extended position, wherein the locating member would engage a guide when arm 12 is at such extended position.

Figure 4:
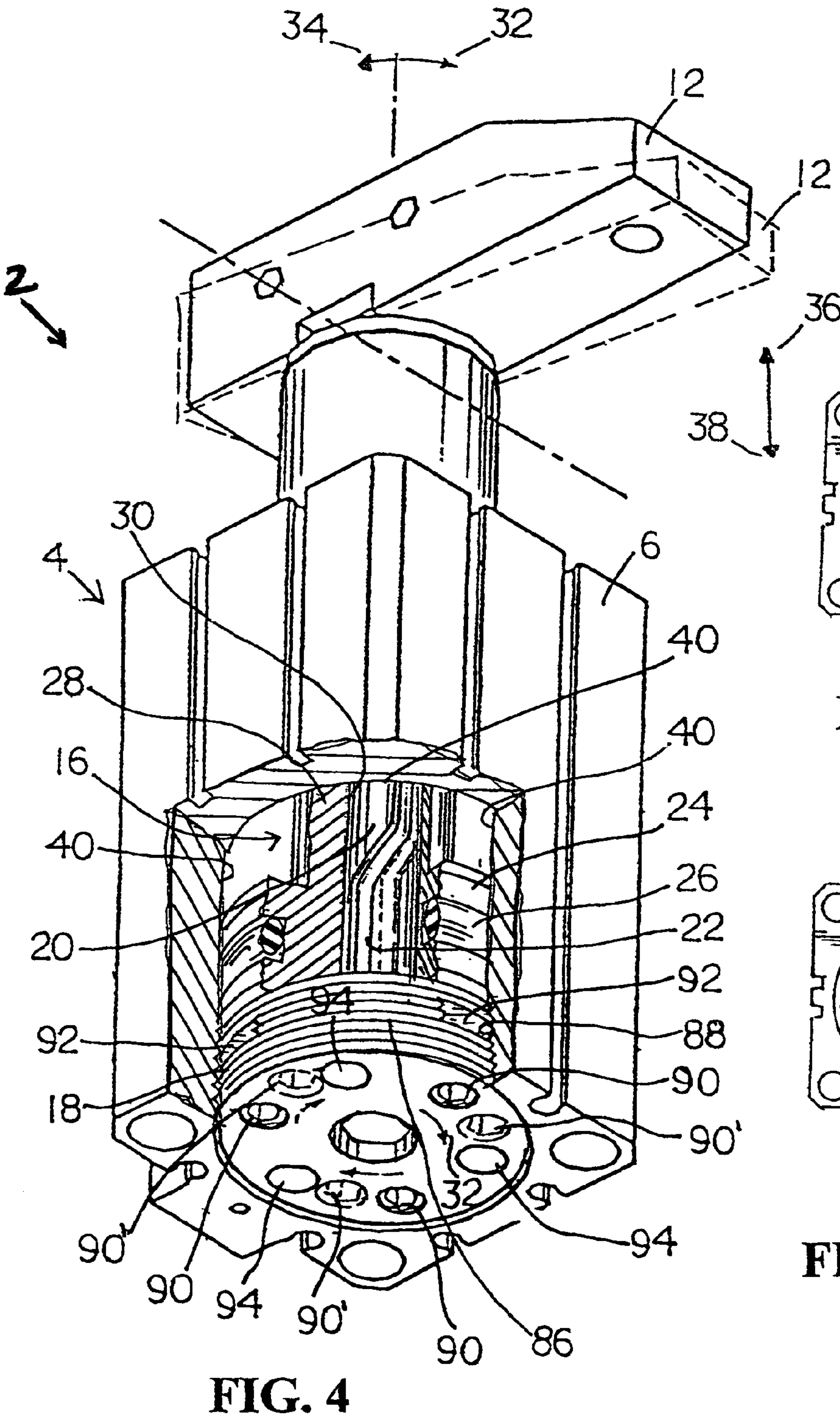
FIG. 4 is a partially cutaway perspective view of the clamp of FIG. 1.

The partially cut-away perspective view of the clamp assembly 2 is shown in FIG. 4. This view shows the position of plug 18 located within cavity 40 of body 6 wherein plug 18 comprises a threaded periphery 86 which corresponds to threads 88 disposed in cavity 40 to allow plug 18 to rotate respectively thereto. Cam member 20 is shown formed in bore 30 which is disposed through piston rod 28 and piston 24. It is appreciated that the bearing member, not shown, that follows along the helical track of cam path 22 can be attached to piston 24 or piston rod 28, for example. In this way, air is directed into cavity 40 to actuate piston 24. Because the bearing member is attached to assembly 16, piston rod 28 will move in directions 32 and 34 as it is being moved in directions 36 and 38.

In the illustrated view, it is contemplated that selectively rotating plug 18 in either directions 32 or 34 can determine the final position of arm 12 with respect to body 6 at either end of the stroke. For example, rotating plug 18 in direction 32 will also cause cam paths 22 to rotate accordingly, which means that, at either the top or bottom of the stroke of arm 12, it will be in a position farther in direction 32 than it was previously. In the illustrated embodiment, set screws 90 are disposed through bore 18 and through-splines 92. Set screws 90 are configured to push against splines 92 to spread the threaded periphery 86 of plug 18, preventing the same from moving. If it is desired to rotate arm 12 so it is in a different position at either the top or the bottom of the stroke, the set screws 90 are loosened. Spanner holes 94 are illustratively provided so that plug 18 can be gripped and rotated in either direction 32 or 34 to affect the desired rotational change. As is shown in FIG. 4, fasteners 90 are also shown in phantom 90' depicting the rotation of plug 18 along with arm 12' correspondingly rotated.

Figure 5:
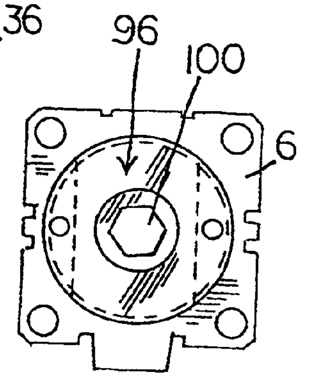
FIG. 5 is an end view of another illustrative embodiment of the swing-arm clamp.
Figure 6:
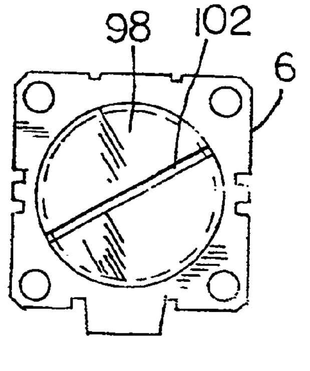
FIG. 6 is an end view of another illustrative embodiment of the swing-arm clamp.

FIGS. 5 and 6 are end views of the bottom of body 6 showing illustrative plugs 96 and 98, respectively. The embodiment shown in FIG. 5 comprises a hex head 100 formed in plug 96 that can engage a sprocket or similar device to rotate plug 96 with respect to body 6 as desired. Similarly, plug 98 includes a slot 102 configured to receive a flat head screwdriver-like tool that can be used to rotate plug 98 with respect to body 6 as well.

Figure 7:
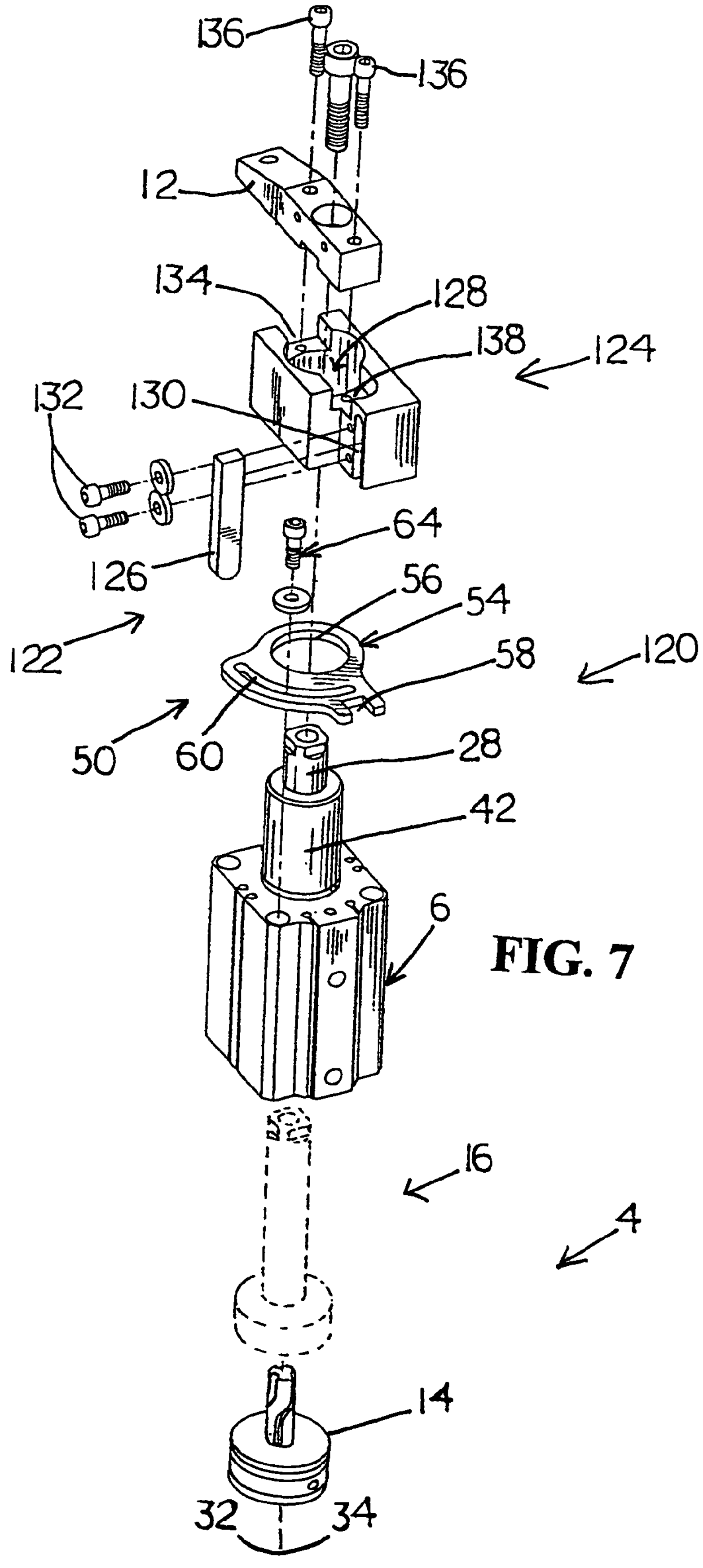
FIG. 7 is an exploded view of another illustrative embodiment of a swing-arm clamp including an illustrative guide assembly and collar assembly.

An exploded view of another illustrative embodiment of a swing-arm clamp 120 is shown in FIG. 7. Clamp 120 comprises similar structures similar to that of clamp assembly 2, including a body 6, a base assembly 14, a piston assembly 16, a collar 42 extending from body 6, a piston rod 28 extending from collar 42, and a jaw arm 12. The guide assembly 122 includes a guide portion 50 which comprises a guide member 54, bore 56; locating guide 58, and adjustment slot 60, also similar to that of assembly 2. In contrast to assembly 2, however, assembly 122 also comprises a collar assembly 124 that is positioned adjacent arm 12 and that also receives a locating member 126. A bore 128 is disposed through collar assembly 124 and is configured to receive piston rod 28. The locating member 126 is illustratively positioned within a recess 130 and held into position through interference fit, as well as fasteners 132. In this illustrative embodiment, arm 12 is fitted within cavities 134 and 138 and attached thereto by fasteners 136.

Figure 8:
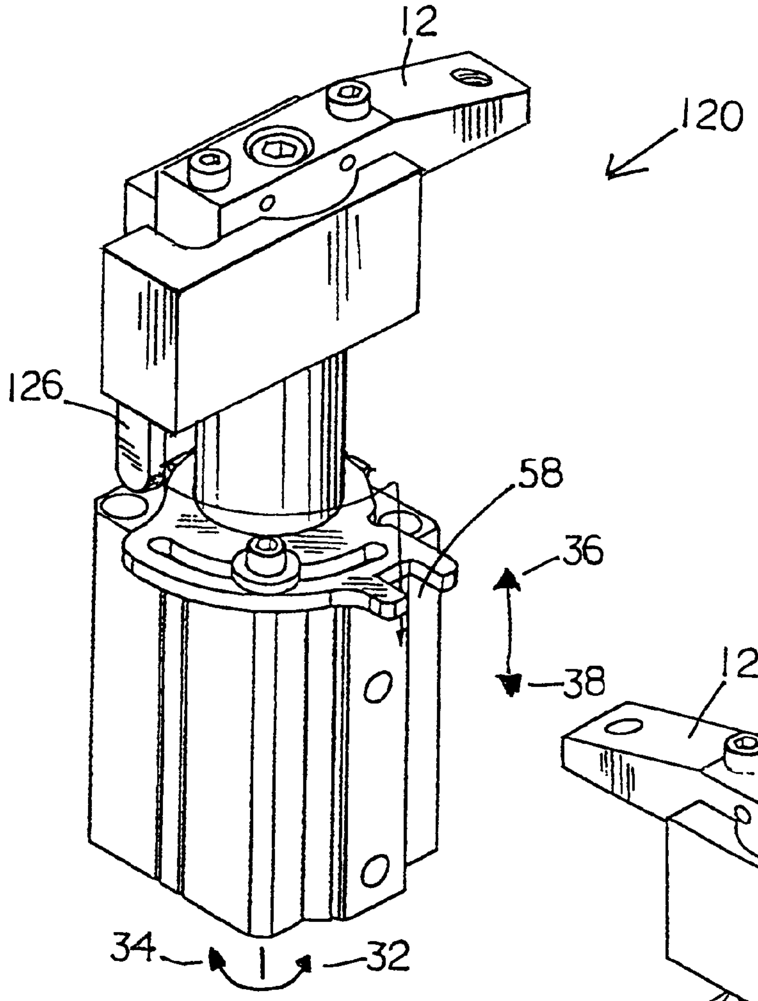
FIG. 8 is a perspective view of the illustrative swing-arm clamp of FIG. 7 in an extended position.
Figure 9:
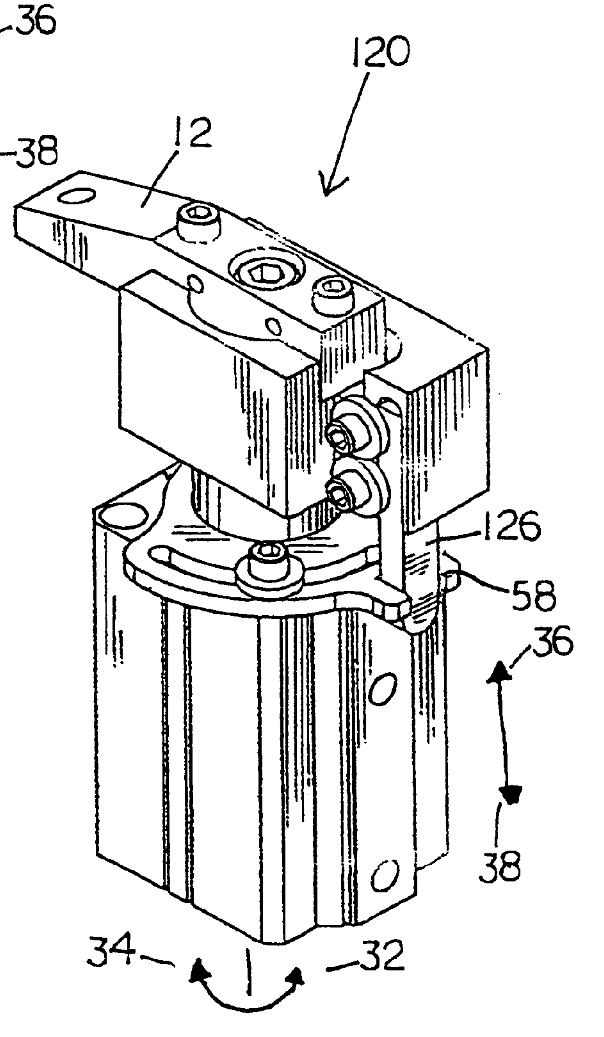
FIG. 9 is a perspective view of the illustrative swing-arm clamp of FIG. 8 in a retracted position.

FIGS. 8 and 9 are perspective views of the illustrative swing-arm clamp 120. Similar to the embodiment shown in FIGS. 2 and 3, the clamp assembly 120 shown in FIG. 8, for example, has arm 12 located in an extended position, wherein, in FIG. 9, arm 12 is located in a retracted position. Also similar to that shown in FIG. 3, the clamping position shown in FIG. 9 occurs when a piston rod 28 moves arm 12 in direction 38 as well as direction 32. Conversely, the releasing position, as shown in FIG. 8, occurs when the arm 12 is moved in directions 36 and 34. When in the clamping position, as shown in FIG. 9, the locating member 126 is shown positioned in guide 58. Again, this is to absorb forces created during clamping which prevents those forces from being absorbed by the cam path, bearing member, or other structures. In contrast, in FIG. 8, when jaw arm 12 is extended and rotated in direction 34, locating member 126 is removed from guide 58 sufficient to clear the assembly 50 while rotating in direction 34.

Figure 10:
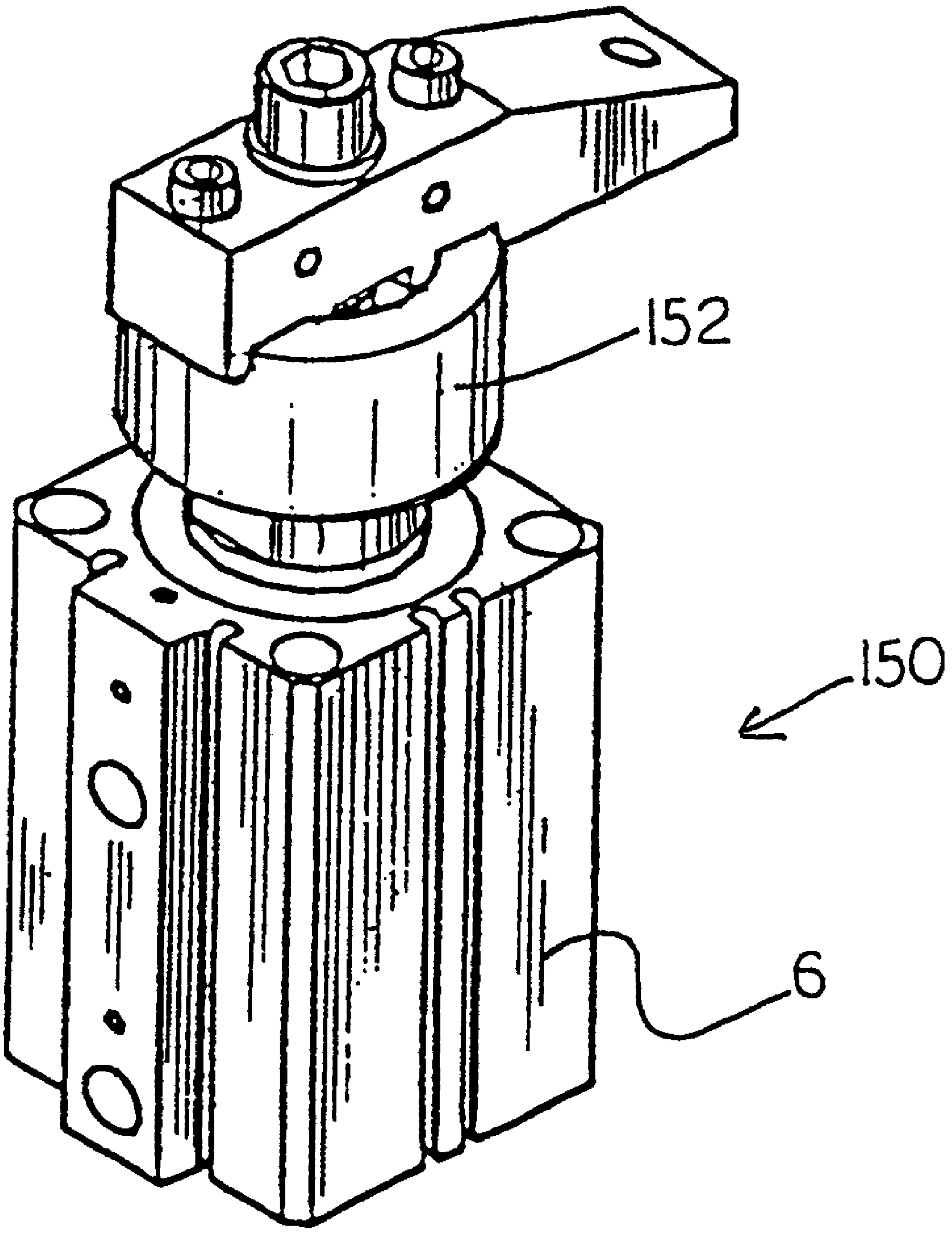
FIG. 10 is a perspective view of an illustrative swing-arm clamp with a collar assembly attached thereto.

A perspective view of another embodiment of an illustrative swing-arm clamp 150 is shown in FIG. 10. This embodiment comprises similar structures to that shared by both assemblies 2 and 120, with the addition of collar 152.

Because such clamps can be used in environments where welding splatter and other debris may exist, collar 152, similar to collars 72 and 124, is intended to protect the piston rod from that debris. As piston rod 28 (see, also, FIGS. 1 and 7) moves in direction 36 and 38, any weld splatter, for example, that would land on the piston rod could affect its ability to move. Hardened metal on the piston rod 28 may block the same from moving in and out of body 6. The collar 152 essentially shrouds the piston rod so that, when in the clamping position, any weld splatter or other debris that might be present would land on collar 152 rather than piston rod 28. In addition, because the outer surface of collar 152 does not move adjacent any other parts within a limited tolerance, any weld splatter that would land thereon would be of only minor consequence.

Figure 12:
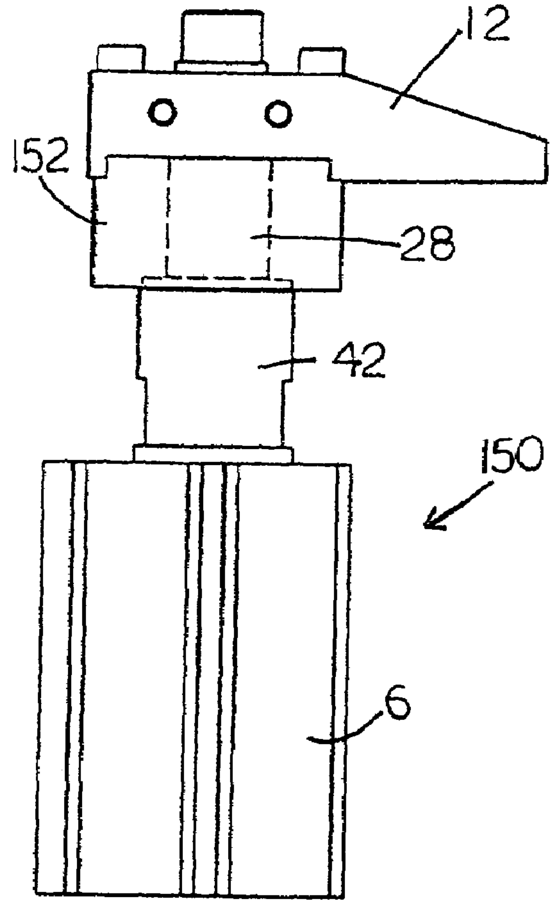
FIG. 12 is a side elevational view of the illustrative swing-arm clamp of FIG. 11 wherein the clamp is in the extended position.
Figure 11:
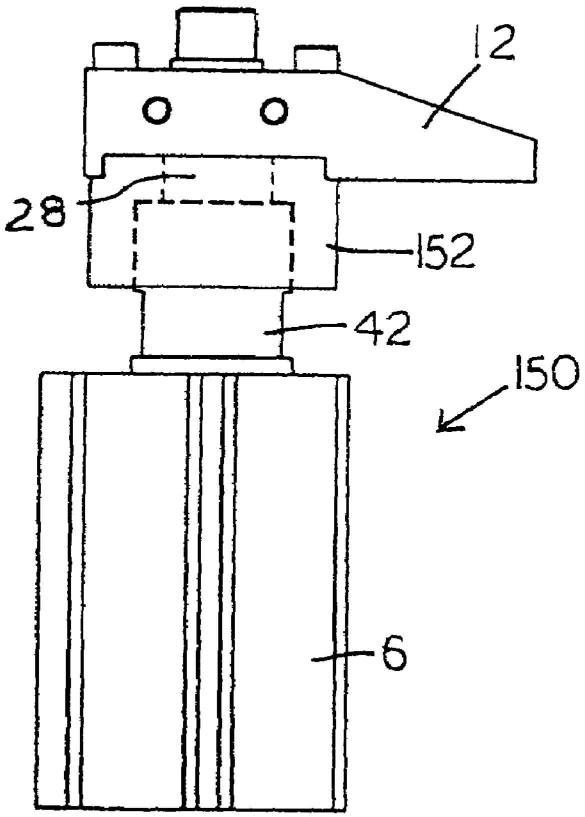
FIG. 11 is a side elevational view of the illustrative swing-arm clamp of FIG. 10 wherein the clamp is in the retracted position.

Side elevational views of swing-arm clamp 150 are shown in both FIGS. 11 and 12. In the illustrative embodiment shown in these views, collar 42 protects piston rod 28, in both the retracted position, as shown in FIG. 11, and in the extended position, as shown in FIG. 12. Specifically with regard to the extended position of FIG. 12, the illustrative embodiment of collar 152 is configured to shroud a portion of collar 42 as well as piston rod 28. The overlap of collar 42 helps insure that piston rod 28 is protected from any weld splatter or other debris in both extended and retracted positions. It is contemplated that when the clamp assembly 150 moves between retracted and extended positions, the relationship between collars 152 and 42 are such that any debris that might accumulate on collar 42 would not prevent collar 152 from moving between the retracted and extended positions.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A swing-arm clamp comprising:

an actuator;

a piston movable in response to the actuator;

a body having the piston movable therein;

a piston rod located within the body and extending from the piston;

wherein the piston rod is movable through the body in response to movement by the piston along a longitudinal axis between first and second positions; and wherein the piston rod is also movable about the longitudinal axis as it is movable along the longitudinal axis;

an arm attached to the piston rod being movable both along the longitudinal axis between the first and second positions, and about the longitudinal axis;

a plug attachable to the body and movable relative thereto;

wherein the plug is selectively positionable to affect the positioning of the piston rod about the longitudinal axis at the lint and second position; and wherein the plug further comprises a hole disposed therein and a spline, and wherein the hole extends to the spline; and a set, wherein at least a portion of which is disposed in the hole to engage the spline to secure the plug in a desired position.

2. The swing-arm clamp of claim 1, wherein the plug is located in a bore in the body.

3. the swing-arm clamp of claim 2, wherein the plug further comprises a threaded periphery that is engagable with a threaded periphery on the bore.

4. The swing-arm clamp of claim 1, wherein the set is a fastener disposed in the plug and engagable with the spline.

5. The swing-arm clamp of claim 1, wherein the spline of the plug is disposed in the plug's threaded periphery.

* * * * *